US008332952B2

(12) United States Patent
Zhang et al.

(10) Patent No.: US 8,332,952 B2
(45) Date of Patent: Dec. 11, 2012

(54) TIME WINDOW BASED CANARY SOLUTIONS FOR BROWSER SECURITY (75) Inventors: Yun Zhang, Shanghai (CN); Brian Robert Tunning, San Francisco, CA (US)

(73) Assignee: Microsoft Corporation, Redmond, WA (US)

( * ) Notice: Subject to any disclaimer, the term of this patent is extended or adjusted under 35 U.S.C. 154(b) by 826 days.

(21) Appl. No.: 12/470,499

(22) Filed: May 22, 2009

(65) Prior Publication Data
US 2010/0299732 A1 Nov. 25, 2010

(51) Int. Cl.
G06F 21/00 (2006.01)
H04L 9/32 (2006.01)

(52) U.S. Cl. ......... 726/26; 726/2; 726/6; 726/9; 726/22; 726/27; 713/168; 709/203; 709/223

(58) Field of Classification Search .................. None
See application file for complete search history.

(56) References Cited

U.S. PATENT DOCUMENTS

| 7,237,024 | B2 | 6/2007 | Toomey |
| 7,500,099 | B1 * | 3/2009 | McElwee et al. ............. 713/168 |
| 7,613,205 | B1 * | 11/2009 | Chen ............................ 370/450 |
| 2005/0216582 | A1 * | 9/2005 | Toomey et al. .............. 709/224 |
| 2007/0136794 | A1 * | 6/2007 | Chin et al. ....................... 726/5 |
| 2008/0115201 | A1 | 5/2008 | Sturms et al. |
| 2008/0222736 | A1 | 9/2008 | Boodaei et al. |
| 2008/0263650 | A1 | 10/2008 | Kerschbaum |
| 2008/0320567 | A1 | 12/2008 | Shulman et al. |
| 2009/0019525 | A1 | 1/2009 | Yu et al. |
| 2009/0076966 | A1 | 3/2009 | Bishop et al. |
| 2009/0259512 | A1 * | 10/2009 | Larkins et al. ..................... 705/9 |
| 2010/0017615 | A1 * | 1/2010 | Boesgaard Sorensen .... 713/176 |

OTHER PUBLICATIONS

Burns, J. "Cross Site Request Forgery: An introduction to a common web application weakness". Information Security Partners, LLC, 2005-2007. https://www.isecpartners.com/files/CSRF_Paper.pdf.*
Barth, A., Jackson, C., and Mitchell, J.C., "Robust defenses for cross-site request forgery". In 15th ACM Conference on Computer and Communications Security (CCS), Oct. 2008.*
"Protect your Site with URL Rewriting", Retrieved at<<http://msdn.microsoft.com/en-us/magazine/dd458793.aspx>>, pp. 5.
"Wiki: Cross-site Request Forgery ", Retrieved at<<http://wapedia.mobi/en/Cross-site_request_forgery#5.>>, pp. 6.
"Security Corner: Cross-Site Request Forgeries", Retrieved at<<http://shiflett.org/articles/cross-site-request-forgeries>>, Dec. 13, 2004, pp. 34.
"Protect your Site with URL Rewriting" Retrieved at<<http://msdn.microsoft.com/en-us/magazine/dd458793.aspx>>, pp. 5.
"Wiki: Cross-site Request Forgery", Retrieved at<<http:wapedia.mobi/en/Cross-site_request_forgery#5.>>, pp. 6.

* cited by examiner

Primary Examiner — Philip Chea
Assistant Examiner — Dorianne Alvarado David (57) ABSTRACT

Tools and techniques related to time window based canary solutions for browser security are provided. These tools may receive requests to generate canary values in connection with providing content maintained on server systems, and compute canary values in response to these requests. These canary values may be based on identity information associated with different users, site-specific values associated with websites accessed by these users, and representations of time windows associated with the requests.

14 Claims, 5 Drawing Sheets

TIME WINDOW BASED CANARY SOLUTIONS FOR BROWSER SECURITY

BACKGROUND

Web-based content is becoming increasingly accessible to a variety of user devices using browser software. With this increased availability, however, comes an increased risk of attacks directed to servers hosting the Web-based content. Cross-site request forgery (CSFR) attacks provide only one example of vulnerabilities faced by these servers. In the past, various dynamic canary solutions have been proposed to combat these attacks.

SUMMARY

Tools and techniques related to time window based canary solutions for browser security are provided. These tools may receive requests to generate canary values in connection with providing content maintained on server systems, and compute canary values in response to these requests. These canary values may be based on identity information associated with different users, site-specific values associated with websites accessed by these users, and representations of time windows associated with the requests.

It should be appreciated that the above-described subject matter may be implemented as a computer-controlled apparatus, a computer process, a computing system, or as an article of manufacture such as a computer-readable medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

The following detailed description provides tools and techniques for time window based canary solutions for browser security. While the subject matter described herein presents a general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

The following detailed description refers to the accompanying drawings that form a part hereof, and that show, by way of illustration, specific example implementations. Referring now to the drawings, in which like numerals represent like elements through the several figures, this description provides various tools and techniques related to time window based canary solutions for browser security.

Figure 1:
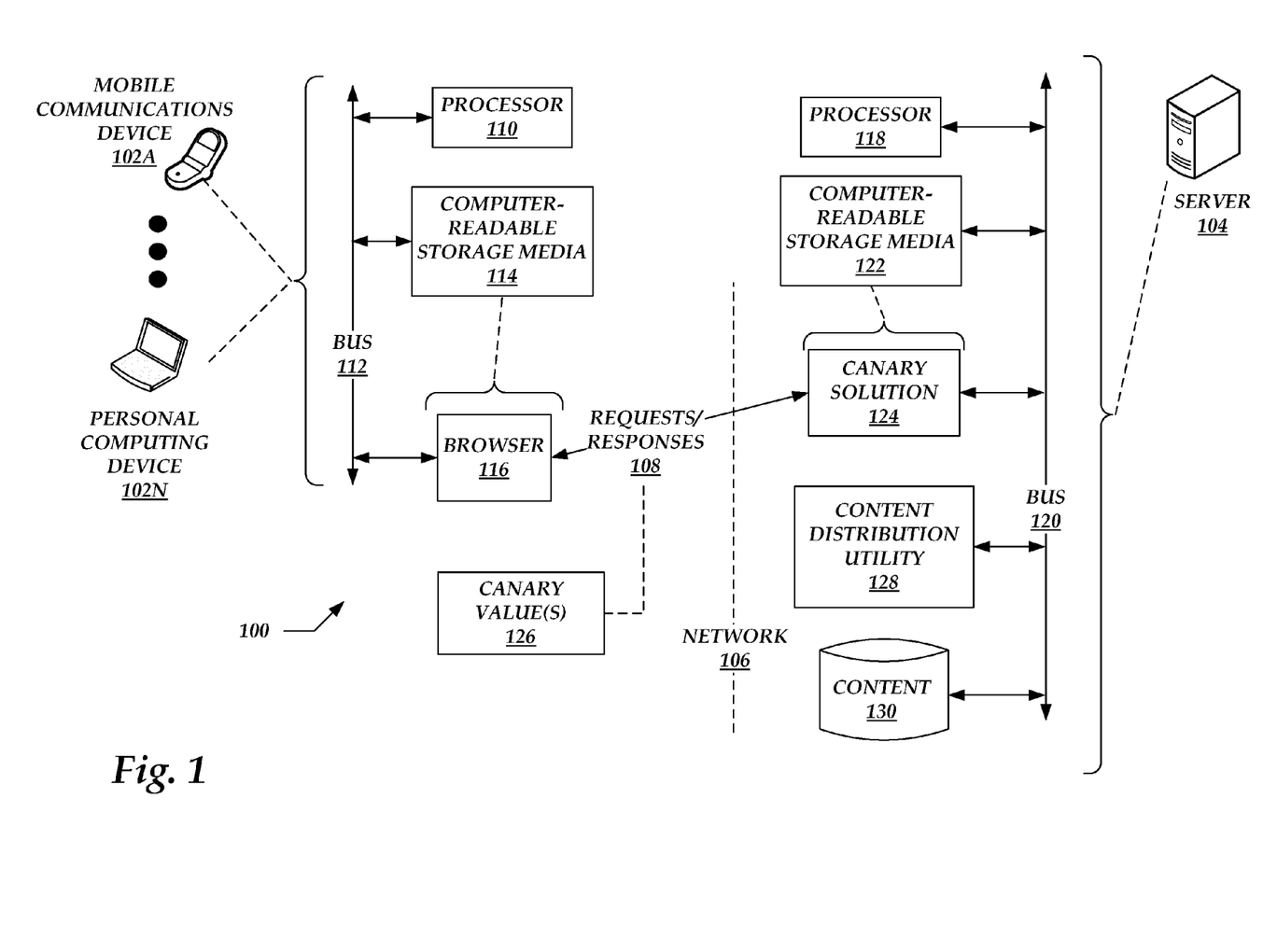
FIG. 1 is a block diagram illustrating overall systems or operating environments for providing time window based canary solutions for browser security.

FIG. 1 illustrates systems or operating environments, denoted generally at 100, related to time window based canary solutions for browser security. Turning to FIG. 1 in more detail, these systems 100 may support any number of computing devices that may communicate over suitable networks. For example, FIG. 1 illustrates representative mobile communications devices 102a, which may include cellular telephones, wireless-enabled personal digital assistants (PDAs), smartphones, and the like. FIG. 1 also illustrates representative personal computing devices 102n, which may include desktop computing systems, netbooks, portable notebook or laptop computing systems, and the like. In providing the above examples of devices 102a and 102n (collectively, devices 102), it is noted that implementations of this description may support other types of devices, without departing from the scope and spirit of this description.

The devices 102 may communicate with any number of server systems 104 over one or more communications networks 106. The networks 106 may generally represent global, wide-area, regional, local-area, or personal networks. In addition, the networks 106 may represent network adapters, connectors, cabling and other hardware infrastructure associated with the foregoing communications networks, as well as any drivers or software associated with communicating through the networks 106.

Turning to the server systems 104, these server systems 104 may interact with and support any number of devices 102. Without limiting possible implementations of this description, the discussion herein provides examples in which the server systems 104 respond to requests from the devices 102. FIG. 1 generally denotes these requests at 108.

Turning to the devices 102a and 102n in more detail, these devices may include one or more instances of processing hardware, with FIG. 1 providing a representative processor 110 as an example of such processing hardware. The processors 110 may have a particular type or architecture, chosen as appropriate for particular implementations of the devices 102. In addition, the processors 110 may couple to one or more bus systems 112, having type and/or architecture that is chosen for compatibility with the processors 110.

The devices 102 may include one or more instances of a physical computer-readable storage medium or media 114, which couple to the bus systems 112. The bus systems 112 may enable the processors 110 to read code and/or data to/from the computer-readable storage media 114. The media 114 may represent apparatus in the form of storage elements that are implemented using any suitable technology, including but not limited to semiconductors, magnetic materials, optics, or the like. The media 114 may represent memory components, whether characterized as RAM, ROM, flash, solid-state hard drive, or other types of technology.

The storage media 114 may include one or more modules of software instructions that, when loaded into the processors 110 and executed, cause the devices 102 to execute software in connection with providing canary-based solutions for browser security. As detailed throughout this description, these modules of instructions may also provide various tools or techniques by which the devices 102 may participate within the overall systems or operating environments described herein using the components, message and command flows, and data structures discussed in more detail throughout this description. For example, the storage media 114 may contain browser software, denoted generally at 116. The browser software 116 may execute software instructions that are configured to perform the functions described herein in connection with providing canary-based solutions for browser security. In addition, the browser software 116 may represent full-featured browser applications running on the personal computing devices 102n, and may also represent relatively compact browser applications running on the mobile communications devices 102a.

In general, the browser software 116 may, when loaded into the processors 110 and executed, transform the processors 110 (and the overall devices 102) from general-purpose computing systems into special-purpose computing systems customized to present integrated advertising content. The processors 110 may be constructed from any number of transistors or other discrete circuit elements, which may individually or collectively assume any number of states. More specifically, the processors 110 may operate as finite-state machines, in response to software instructions executed within the browsers 116. These computer-executable instructions may transform the processors 110 by specifying how the processors 110 transition between states, thereby physically transforming the transistors or other discrete hardware elements constituting the processors 110.

Encoding and programming the browser software 116 may also transform the physical structure of the storage media 114. The specific transformation of physical structure may depend on various factors, in different implementations of this description. Examples of such factors may include, but are not limited to: the technology used to implement the storage media 114, whether the storage media 114 are characterized as primary or secondary storage, and the like. For example, if the storage media 114 is implemented as semiconductor-based memory, software executing within the browser 116 may transform the physical state of the semiconductor memory, when the software is encoded therein. For example, the software may transform the states of transistors, capacitors, or other discrete circuit elements constituting the semiconductor memory.

As another example, the storage media 114 may be implemented using magnetic or optical technology. In such implementations, the browser software 116 may transform the physical state of such magnetic or optical media, when the software 116 is encoded therein. These transformations may include altering the magnetic characteristics of particular locations within given magnetic media. These transformations may also include altering the physical features or characteristics of particular locations within given optical media, to change the optical characteristics of those locations. Other transformations of physical media are possible without departing from the scope and spirit of the present description, with the foregoing examples provided only to facilitate this discussion.

Turning to the server systems 104 in more detail, these systems may include one or more instances of processing hardware, with FIG. 1 providing a representative processor 118 as an example of such processing hardware. The processors 118 may have a particular type or architecture, chosen as appropriate for particular implementations of the systems 104. In addition, the processors 118 may couple to one or more bus systems 120, having type and/or architecture that is chosen for compatibility with the processors 118. It is noted that the type and architecture of the processors 118 and bus systems 120 may or may not be the same as the type and architecture of the processors 110 and the bus systems 112.

The systems 104 may include one or more instances of a physical computer-readable storage medium or media 122, which couple to the bus systems 120. The bus systems 120 may enable the processors 118 to read code and/or data to/from the computer-readable storage media 122. The media 22 may represent apparatus in the form of storage elements that are implemented using any suitable technology, including but not limited to semiconductors, magnetic materials, optics, or the like. The media 122 may represent memory components, whether characterized as RAM, ROM, flash, solid-state hard drive, or other types of technology.

The storage media 122 may include one or more modules of software instructions that, when loaded into the processors 118 and executed, cause the systems 104 to execute software in connection with providing canary-based solutions for browser security. As detailed throughout this description, these modules of instructions may also provide various tools or techniques by which the systems 104 may participate within the overall systems or operating environments described herein using the components, message and command flows, and data structures discussed in more detail throughout this description. For example, the storage media 122 may contain software, denoted generally at 124, suitable for processing canary values 126 embedded into the requests and/or responses 108. The canary solution software 124 may execute software instructions that are configured to perform the functions described herein in connection with providing canary-based solutions for browser security.

In general, the canary solution software 124 may, when loaded into the processors 118 and executed, transform the processors 118 (and the overall systems 104) from general-purpose computing systems into special-purpose computing systems customized to present integrated advertising content. The processors 118 may be constructed from any number of transistors or other discrete circuit elements, which may individually or collectively assume any number of states. More specifically, the processors 118 may operate as finite-state machines, in response to software instructions contained within the canary solution software 124. These computer-executable instructions may transform the processors 118 by specifying how the processors 118 transition between states, thereby physically transforming the transistors or other discrete hardware elements constituting the processors 118.

Encoding and programming the canary solution software 124 may also transform the physical structure of the storage media 122. The specific transformation of physical structure may depend on various factors, in different implementations of this description. Examples of such factors may include, but are not limited to: the technology used to implement the storage media 122, whether the storage media 122 are characterized as primary or secondary storage, and the like. For example, if the storage media 122 is implemented as semiconductor-based memory, the canary solution software 124 may transform the physical state of the semiconductor memory, when the software is encoded therein. For example, the software may transform the states of transistors, capacitors, or other discrete circuit elements constituting the semiconductor memory.

As another example, the storage media 122 may be implemented using magnetic or optical technology. In such implementations, the canary solution software 124 may transform the physical state of such magnetic or optical media, when the software 124 is encoded therein. These transformations may include altering the magnetic characteristics of particular locations within given magnetic media. These transformations may also include altering the physical features or characteristics of particular locations within given optical media, to change the optical characteristics of those locations. Other transformations of physical media are possible without departing from the scope and spirit of the present description, with the foregoing examples provided only to facilitate this discussion.

The canary solution software 124 may operate in connection with other software executed by the server systems 104. For example, the storage media 122 may also include software 128 that provides a content distribution utility, by which the server systems 104 may manage the distribution and editing of content 130 among the devices 102. More specifically, the canary solution software 124 may manage access to the content 130 on behalf of the server systems 104, as described in further detail below.

Figure 2:
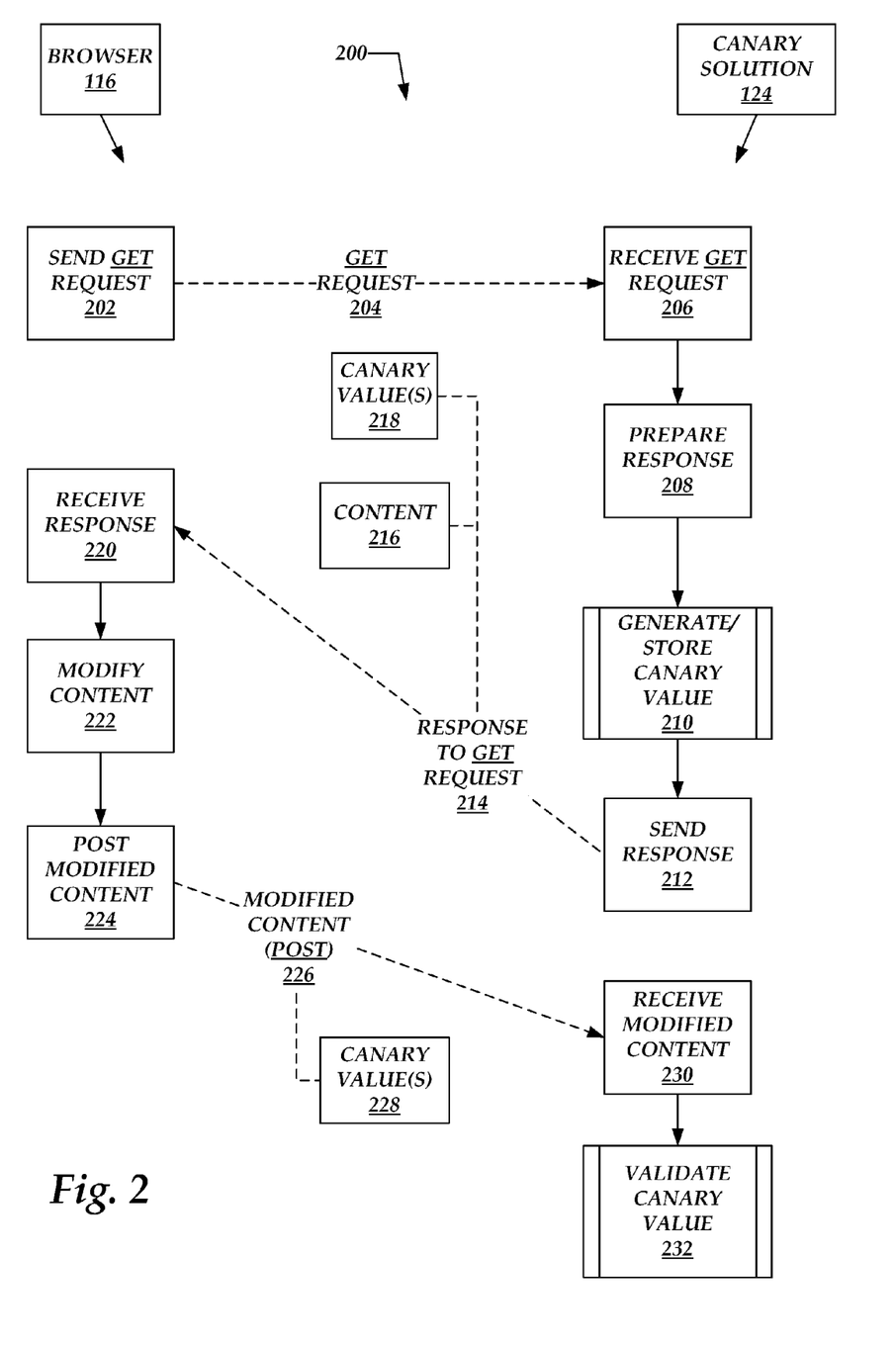
FIG. 2 is a flow chart illustrating processes for providing time window based canary solutions for browser security.

FIG. 2 illustrates process flows, denoted generally at 200, that may be performed in connection with time window based canary solutions for browser security. The purposes of providing this description, but not to limit possible implementations of this description, the process flows 200 are described in connection with the browser software 116 and the canary solution software 124. However, implementations of this description may perform at least portions of the process flows 200 in connection with other components, without departing from the scope and spirit of the present description.

Turning to the process flows 200 in more detail, block 202 represents sending a suitable request from a given requesting device (e.g., 102a or 102n as shown in FIG. 1) to a server system (e.g., 104 in FIG. 1). For example, block 202 may include the browser 116 sending a "GET" command as defined by the hypertext transfer protocol ("HTTP"). FIG. 2 provides an example of such a request or command at 204.

Block 206 represents receiving the GET request 204. For example, block 206 may include the canary solution receiving the GET request, although other software executing on the server systems 104 may also receive the GET request. In some implementation scenarios, block 206 may include receiving a GET request for content (e.g., 130 in FIG. 1). This request the content may include documents, files, or other information whose distribution to the devices 102 is managed by the server systems 104.

Block 208 represents preparing a response to the request 204. For example, if the request 204 pertains to accessing a given document stored as part of the content 130, block 208 may include accessing the requested document, and preferring it for transmission to the requesting device 102.

Block 210 represents generating and storing a canary value to be associated with the content as distributed to the requesting device 102. Various illustrative procedures used to generate the canary value are described in further detail below.

Block 212 represents sending a response 214 to the request 204. This response 214 may include at least one instance of requested content 216, and one or more canary values 218 generated, for example in block 210.

Block 220 represents receiving the response 214. For example, block 220 may include the browser 116 receiving the response 214 in reply to the request 204.

Block 222 represents receiving indication of some modification to the content 216 that was included within the response 214. The type and nature of this modification may vary in different implementations of this description. In general, however, the browser 116 may facilitate modifications of the content 216 on the devices 102a or 102n.

Block 224 represents requesting that a subsequent version of the content (e.g., modified content) be posted back to the server system 104. FIG. 2 represents the modified content generally at 226, with the modified content 226 being associated with canary values 228 as shown. Typically, the embedded canary values 218 and 228 are hidden, with suitable protection mechanisms in place to reduce the risk that the browser 116 and/or users of the devices 102 may access and compromise the canary values 218 and 228.

Block 230 represents receiving the modified content 226 and the associated canary values 228. In turn, block 232 represents validating the canary values 228 as received with the modified content 226. As detailed further below, if the canary values 228 are valid, the canary solution software 124 may accept and post the modified content 226. However, if the canary values 228 are invalid, the canary solution software 124 may reject the modified content 226.

Figure 3:
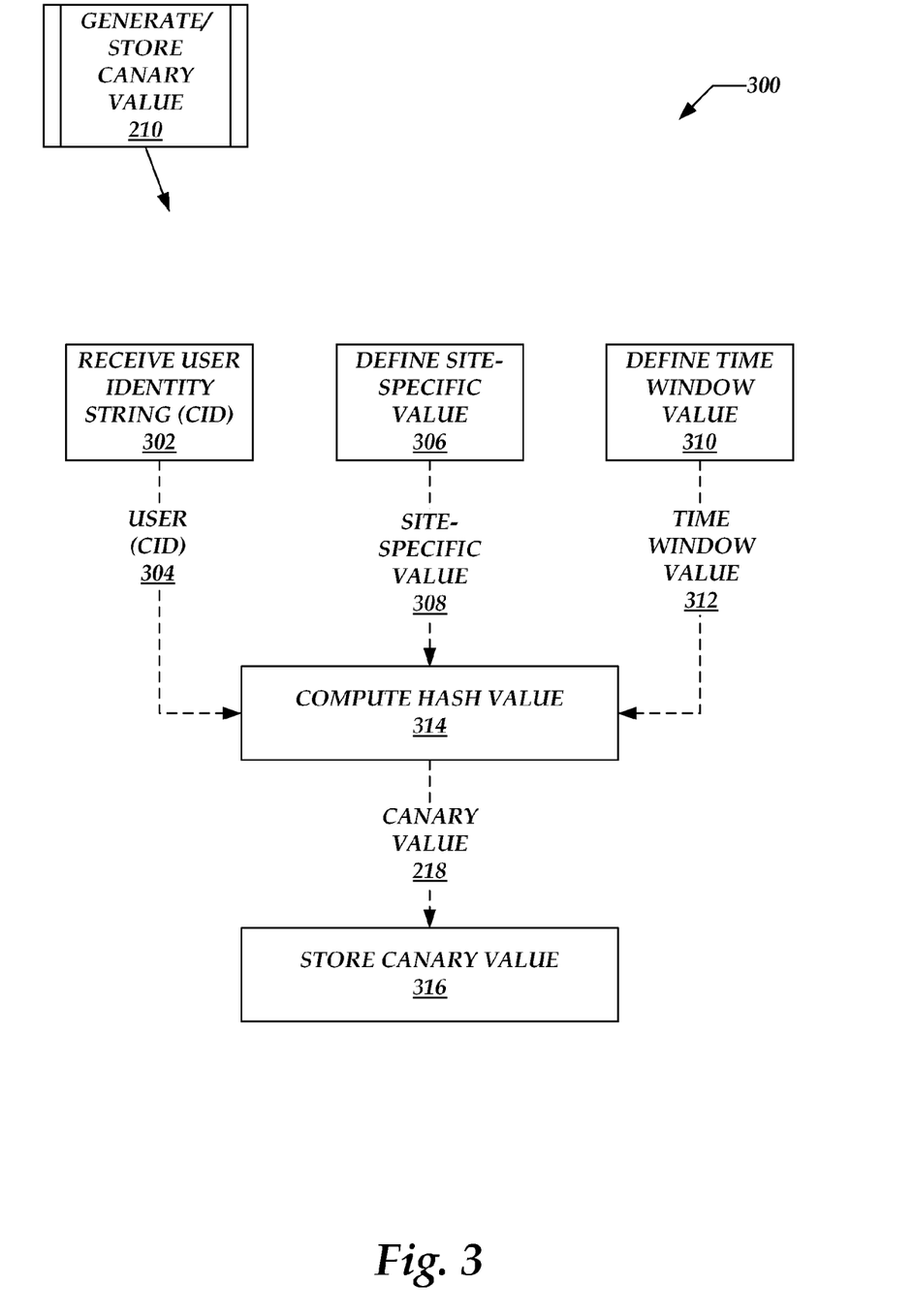
FIG. 3 is a flow chart illustrating processes for generating canary values as shown in FIG. 2.

FIG. 3 illustrates process flows, denoted generally at 300, for generating the canary values 218 shown in FIG. 2. Without limiting possible implementations of this description, the process flows 300 may be understood as elaborating further on block 210 shown in FIG. 2.

Turning to the process flows 300 in more detail, the canary values 218 may be generated based upon respective user identity strings associated with any number of particular users. For example, a given particular user may utilize browser software (e.g., 116 in FIG. 1) that is executing on one of the devices 102a or 102n to navigate and edit Web-based content, and the like. Accordingly, the browser software 116 may request one or more pages from the server system 104, so that this particular user may browse and/or edit these pages. When the server system 104 serves the requested pages, the server system 104 may associate an instance of the user identity strings (abbreviated as CIDs in this description and drawings) with this particular user. In some implementations, these user identity strings may be publicly visible. Block 302 represents receiving at least one instance of user identity strings 304. The user identity strings 304 may be represented as a private unique user identity, and in some implementations, may represent identifiers associated with sessions established between devices (e.g., 102a and 102n in FIG. 1) and server systems (e.g., 104 in FIG. 1).

Block 306 represents defining at least one site-specific value 308 that is used in combination with the user identity strings 304 to generate the canary value 218. For example, assuming that the server system 104 is operating one or more websites, block 306 may include associating respective site-specific values 308 with these different websites. In scenarios in which a given website is hosted by multiple server systems 104, those multiple server systems 104 may share the site-specific value 308 that is associated with this given website. In some scenarios, the site-specific values 308 may be implemented as private keys.

Block 310 represents defining a plurality of time window values. Time window values are illustrated and described further below in connection with FIG. 5. However, in overview, block 310 may include establishing a plurality of time windows of any convenient duration or width.

The width or duration of the time window may be chosen as a trade-off between security and overall user experience. Lengthening the time window in block 310 may improve user experience, because fewer instances of posted content (e.g., 226 in FIG. 2) would become stale and invalid. However, lengthening the time window may expose the canary solutions described herein to additional risk of compromise. In example implementations, the time window established in block 310 may be approximately equal to the time duration of an authentication window applicable to sessions established between the server system 104 and respective devices 102, as shown in FIG. 1. For example, these authentication windows may the approximately 4 hours in duration.

FIG. 3 provides at 312 an example of a time window value. In example implementations, the time window value 312 may be represented as a string or other convenient variable type.

Block 314 represents computing a hash value, based at least upon the user identity strings 304, the site-specific values 308, and the time window values 312. Block 314 may employ any suitable hashing algorithm, with secure hashing algorithms (SHAs) providing non-limiting examples suitable techniques for generating the canary value 218. Block 314 may include combining (e.g., adding) representations of the user identity strings 304, the site-specific values 308, and the time window values 312 in computing the canary value 218.

Block 316 represents storing the computed canary value 218 for embedding within a response (e.g., 214 in FIG. 2) sent to a given device. In addition, block 316 may include caching or storing the canary value 218 for later reference when validating canary values (e.g., 228 in FIG. 2) received from that given device.

Figure 4:
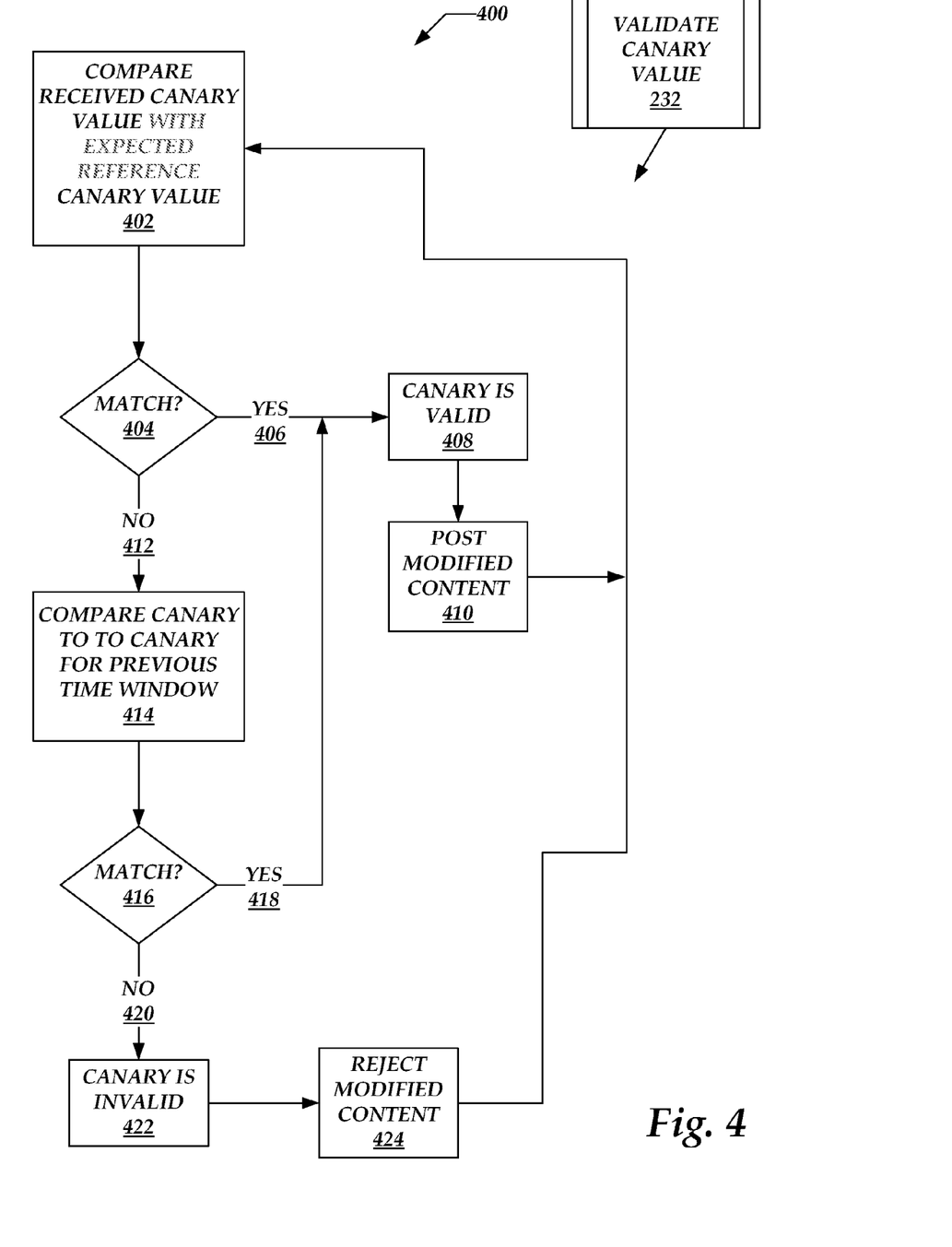
FIG. 4 is a flow chart illustrating processes for validating canary values that are received with requests to post content to a server system.

FIG. 4 illustrates process flows, denoted generally at 400, for validating canary values (e.g., 228 shown in FIG. 2) that are received with requests to post content to a server system (e.g., 104 in FIG. 1). Without limiting possible implementations of this description, the process flows 400 may be understood as elaborating further on block 232 shown in FIG. 2.

Turning to the process flows 400 in more detail, block 402 represents comparing the received canary value 228 with a reference or expected canary value (e.g., 218 in FIG. 2). In some cases, the reference or expected canary value 218 may be stored or cached, as discussed above with block 316 in FIG. 3. In other cases, block 402 may include computing the reference or expected canary value 218 when the request to post content arrives at the server system.

Decision block 404 represents determining whether the received canary value matches the reference or expected canary value. If the received canary value matches the expected canary value, the process flows 400 may take Yes branch to block 408, which represents determining that the received canary value is valid. In turn, the process flows 400 may receive to block 410, which represents posting any modified content (e.g., 226 in FIG. 2) that is associated with the received canary value. After performing block 410, the process flows 400 may return to block 402, to await arrival of the next modified content and the received canary value associated with this modified content.

Returning to decision block 404, if the received canary value does not match the expected canary value, the process flows 400 may take No branch 412 to block 414. Block 414 represents comparing the received canary value to a canary value associated with an immediately previous time window. Successive time windows are illustrated and discussed in more detail with FIG. 5. However, at least some implementations of this description may recognize canary values associated with two successive time windows as valid. Put differently, some implementations of this description may provide some degree of look-behind capability when validating received canary values.

In implementations that provide look-behind capability, decision block 416 represents evaluating whether the received canary value matches a canary value calculated for an immediately previous time window. From decision block 416, if the received canary value matches canary value for the previous time window, the process flows 400 may take Yes branch 418 to block 408, thereby validating the received canary value.

Returning to decision block 416, if the received canary value does not match the canary value for the previous time window, the process flows 400 may take No branch 420 to block 422. Block 422 represents determining that the received canary value is invalid. In turn, block 424 represents rejecting any content (e.g., 226 in FIG. 2) that is associated with the invalid canary value. Afterwards, the process flows 400 may return to block 402 to await arrival of the next received canary value.

In implementations that do not support look-behind capability, the No branch 412 may lead directly to blocks 422 and 424. Accordingly, these implementations may bypass blocks 414 and 416 and not test or analyze the canary values associated with previous time windows.

The received canary values 428 may be invalid for a variety of reasons. For example, the canary values 218 may be computed on a per-site basis. Thus, if the canary values 218 as computed for one site are leaked to another website, and then resubmitted with modified content from that other website, the processes 400 would determine that these leaked canary values are invalid, because the canary values were calculated for two different sites.

In addition, the canary values 218 may be computed on a per-user basis. Accordingly, if one user leaks his or her computed canary value to another user, and if that other user submits modified content associated with that leaked canary value, the processes 400 would determine that these leaked canary values are invalid, because the canary values were calculated for two different users.

In other scenarios, the canary values 218 are computed based on time. Put differently, the canary values 218 are time-sensitive, and are valid for a predefined duration of time. As now described with FIG. 5, different implementations may analyze the timeliness of the canary values 218 using different techniques.

Figure 5:
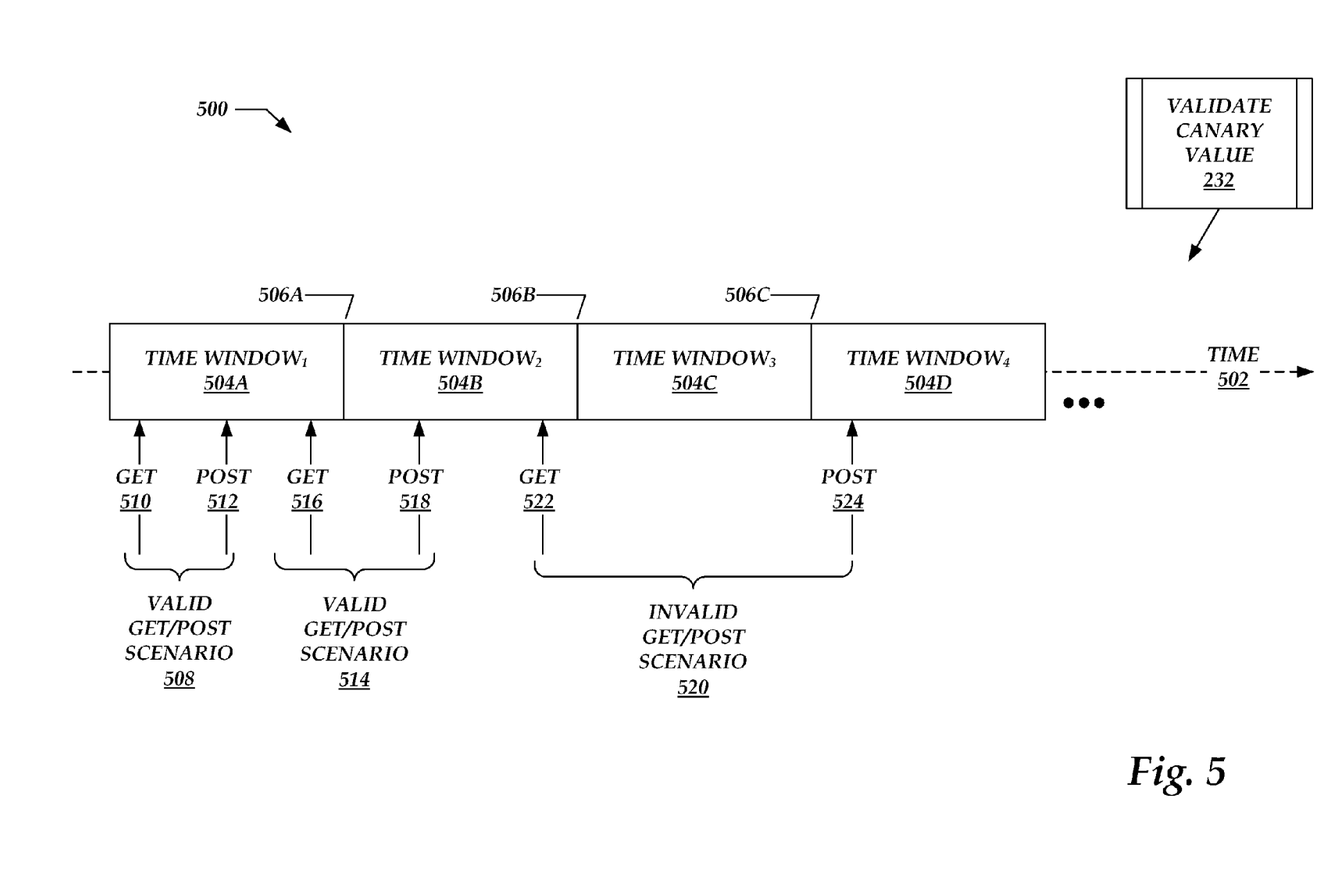
FIG. 5 is a block diagram illustrating a sequence of time windows that provide examples of timely and stale GET and POST operations.

FIG. 5 illustrates a sequence of time windows, denoted generally at 500, that provide examples of timely and stale GET and POST operations. Without limiting possible implementations of this description, the time windows 500 and related processing may be understood as elaborating further on block 232 shown in FIG. 2.

Turning to the time windows 500 in more detail, FIG. 5 illustrates a timeline 502 that represents an arbitrary interval of time. The timeline 502 may be subdivided into any convenient number of individual time windows, with four time windows 504a-504d (collectively, time windows 504) shown only for illustration. In addition, FIG. 5 illustrates time window boundaries 506a, 506b, and 506c (collectively, time window boundaries 506), which occur between successive time windows 504.

The illustrated time windows 504 and time window boundaries 506 may provide a framework for analyzing whether sequences of GET and POST operations are timely. Put differently, different GET and POST operations may be associated with respective canary values. For example, GET operations may be associated with the canary values 218 as shown in FIG. 2, and POST operations may be associated with the canary values 228 as also shown in FIG. 2.

As shown at 508, a valid GET/POST scenario may involve a GET operation 510 and a POST operation 512, which are respectively associated with canary values. The GET/POST scenario 508 may be recognized as timely if the respective canary values associated with the GET operation 510 and the POST operation 512 indicate that both of the operations 510 and 512 occurred within the time window 504a.

As shown at 514, some implementations of this description may recognize as valid those GET/POST scenarios in which a GET operation 516 and a corresponding POST operation 518 cross one time window boundary (e.g., 506a). In the example shown at 514, the GET operation 516 occurs within the time window 504a and the corresponding POST operation 518 occurs in the next time window 504b. However, because this GET/POST scenario 514 crosses a single time boundary 506a, some implementations of this description may recognize the POST operation 518 as timely, relative to the GET operation 516.

It is noted that although the GET/POST scenarios 508 and possibly 514 may be considered timely within the framework shown in FIG. 5, the canary values associated with these GET/POST operations may or may not be valid. For example, even though the canary values are timely, the canary values may be found invalid for other reasons (e.g., leaking from one site to another, leaking from one user to another, etc.).

Examples of stale or untimely GET/POST scenarios are shown at 520, involving an example GET operation 522 that occurs sometime within the time window 504b and an example POST operation 524 to occur sometime within the time window 504d. Because the GET operation 522 and the POST operation 524 span two time boundaries 506b and 506c, the overall GET/POST scenario 520 may be deemed invalid as untimely.

Having described the tools and techniques for time window based canary solutions for browser security in connection with FIGS. 1-5, several observations are noted. The processes described herein for generating and validating canary values may operate without using browser cookies. Accordingly, these processes may operate with cookie-less browsers used on mobile devices. In addition, these processes for generating and validating canary values may operate without exchanging session information or authentication cookie information with browsers.

The foregoing description provides tools and techniques for time window based canary solutions for browser security. Although this description incorporates language specific to computer structural features, methodological acts, and computer readable media, the scope of the appended claims is not necessarily limited to the specific features, acts, or media described herein. Rather, this description provides illustrative, rather than limiting, implementations. Moreover, these implementations may modify and change various aspects of this description without departing from the true spirit and scope of this description, which is set forth in the following claims.

We claim:

1. Apparatus comprising at least one physical computer-readable storage medium having stored thereon computer-executable instructions that, when loaded into at least one hardware processor and executed, transform the hardware processor to perform as a server that provides a process comprising:

receiving from a client browser consecutive requests to generate respective canary values in connection with providing respective contents maintained on at least one server system;

computing, by at least one hardware processor, the canary values, in response to the requests, wherein each canary value is computed based on identity information associated with a user, based on a site-specific value associated with a website accessed by the user, and based on a time value associated with one of the requests, wherein the canary values each have respective sequential time values that correspond to a series of consecutive time windows;

receiving, by at least one hardware processor, post requests to post data from the client browser;

determining, by at least one hardware processor, whether to post the data of the post requests by, for a given post request with a given one of the canary values, first determining that the given canary value is not valid for the current time window, and in response determining that the given canary value is valid for a time window immediately preceding the current time window; and posting, according to the determining, the data of the post requests.

2. The apparatus of claim 1, wherein the instructions to receive at least one request include instructions that transform the hardware processor to receive the request from a browser executing on a device configured to access content from the server system.

3. The apparatus of claim 1, wherein the instructions to compute a canary values include instructions that transform the hardware processor to compute the canary values by performing a hash function on representations of the user identity information, the site-specific value, and the consecutive time windows.

4. The apparatus of claim 1, further comprising instructions that transform the hardware processor to incorporate requested content into the response, and to associate the canary values with the requested contents.

5. The apparatus of claim 1, further comprising instructions that transform the hardware processor to embed the canary values into responses to the requests, and send the responses.

6. Apparatus comprising at least one physical computer-readable storage medium having stored thereon computer-executable instructions that, when loaded into at least one hardware processor and executed, transform the hardware processor to perform a process comprising:

receiving, by at least one hardware processor, at least one instance of a canary value that is associated with content to be posted to a server system;

comparing, by at least one hardware processor, the received canary value to a current canary value that is associated with a version of the content as provided previously by the server system, the comparing indicating that the received canary value does not match the current canary value;

based on the received canary value not matching the current canary value, comparing the canary value to a previous canary value, the previous canary value having been a current canary value that immediately preceded the current canary value;

determining, by at least one hardware processor, whether to post the version of the content on the server system based on the comparing of the received canary value to the previous canary value; and posting, according to the determining, the version of the content on the server system.

7. The apparatus of claim 6, the process further comprising determining that the canary value is invalid due to being untimely.

8. The apparatus of claim 6, the process further comprising establishing a plurality of time windows in connection with validating the canary value.

9. The apparatus of claim 8, wherein the process further comprises evaluating whether the first canary value and the second canary values are respectively associated with successive time windows.

10. The apparatus of claim 6, wherein the first and second canary values comprise respective time values representing respective successive time windows.

11. The apparatus of claim 7, wherein the process further comprises posting the version of the content on the server system.

12. Apparatus comprising at least one physical computer-readable storage medium having stored thereon computer-executable instructions that, when loaded into at least one hardware processor and executed, transform the hardware processor to perform a process comprising:
- receiving, by at least one hardware processor, a first request from a browser executing on a device for content maintained on at least one server system; and
- computing, by at least one hardware processor, a first canary value, in response to the first request, by hashing a representation of a first time window associated with the request, and storing the first canary value on the server system;
- sending, by at least one hardware processor, the content and the associated first canary value to the device in response to the first request;
- receiving from the browser executing on the device a second request for content, the second request received during the first time window, wherein a response sent to the device responsive to the second request for content includes the first canary value;
- receiving from the device a request to post a subsequent version of the content on the server system, the request including the first canary value, wherein the subsequent version of the content is received within a second time window having a second canary value stored on the server system that was hashed from a representation of the second time window, the second time window immediately following the first time window;
- determining, by at least one hardware processor, that the first canary value in the request to post does not match the second canary value stored on the server system, and in response determining that the first canary value in the request to post matches the first canary value stored on the server system, and
- according to such determining posting, by at least one hardware processor, the subsequent version of the content on the server system.

13. The apparatus of claim 10, the process further comprising if it is determined that the first canary value does not match the first canary value stored on the server system then rejecting the subsequent version of content for posting on the server system.

14. The apparatus of claim 10, the process further comprising establishing a plurality of time windows including the first and second time windows.

* * * * *